Aug. 13, 1940.   C. B. NELSON ET AL   2,211,743
BINDER FORMING APPARATUS
Filed July 17, 1936   4 Sheets-Sheet 1
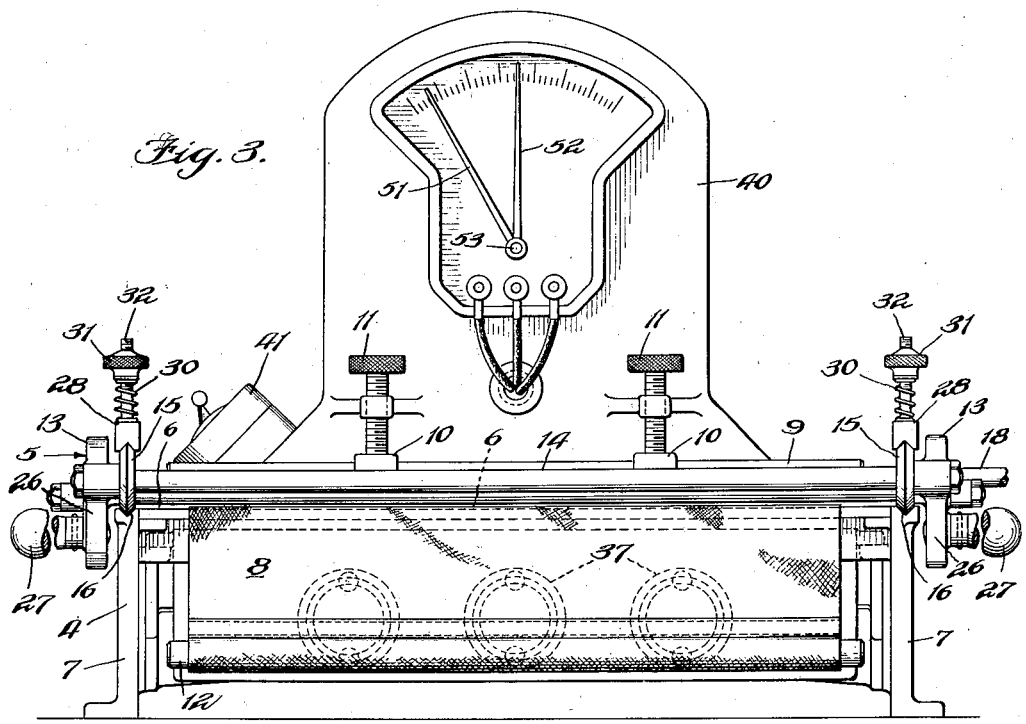
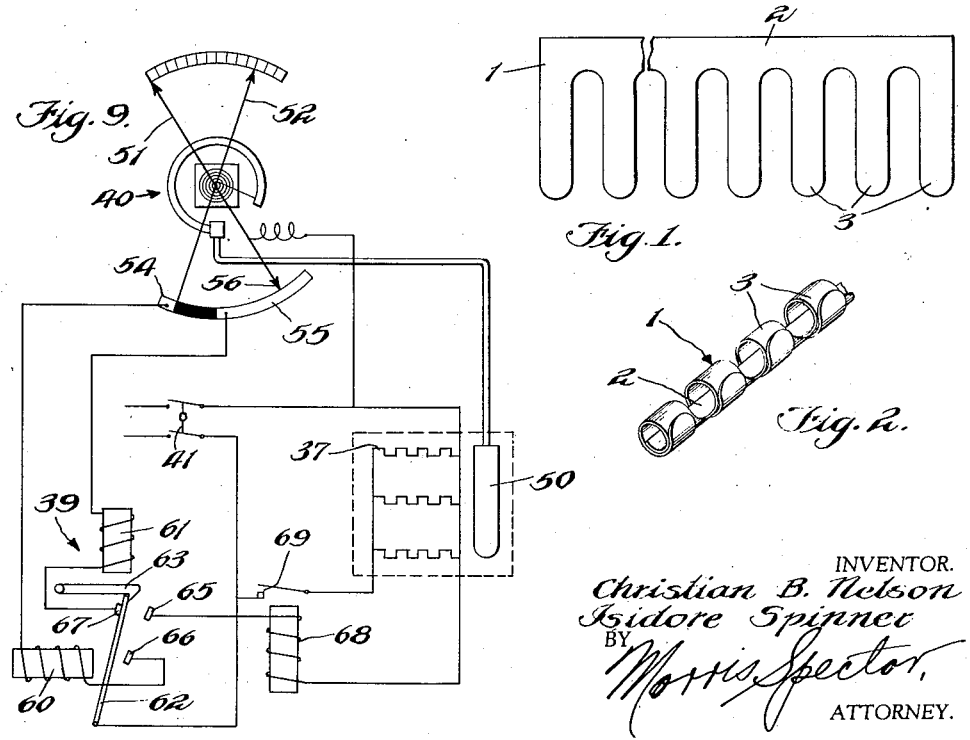
INVENTOR.
Christian B. Nelson
Isidore Spinner
BY
Morris Spector
ATTORNEY.

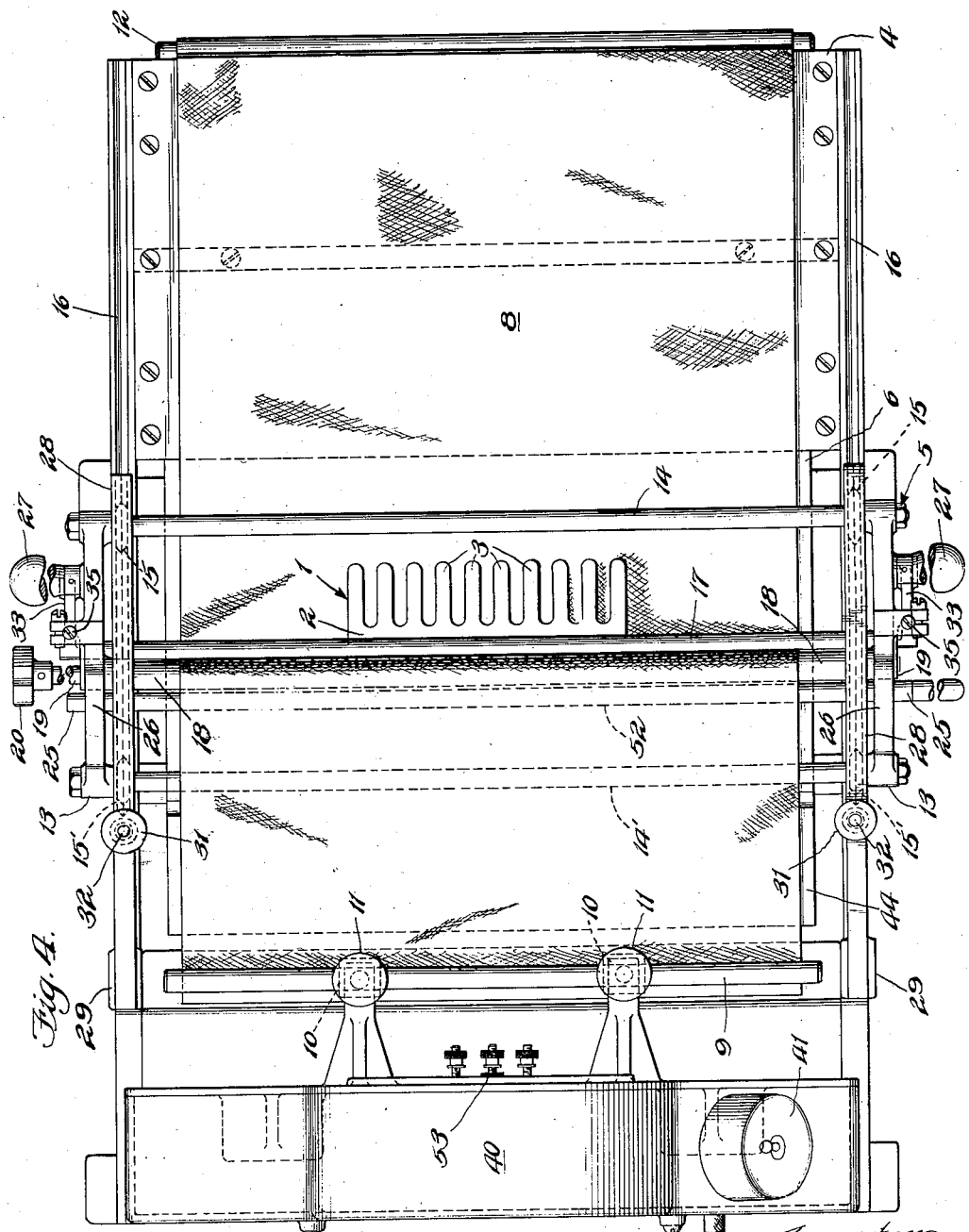

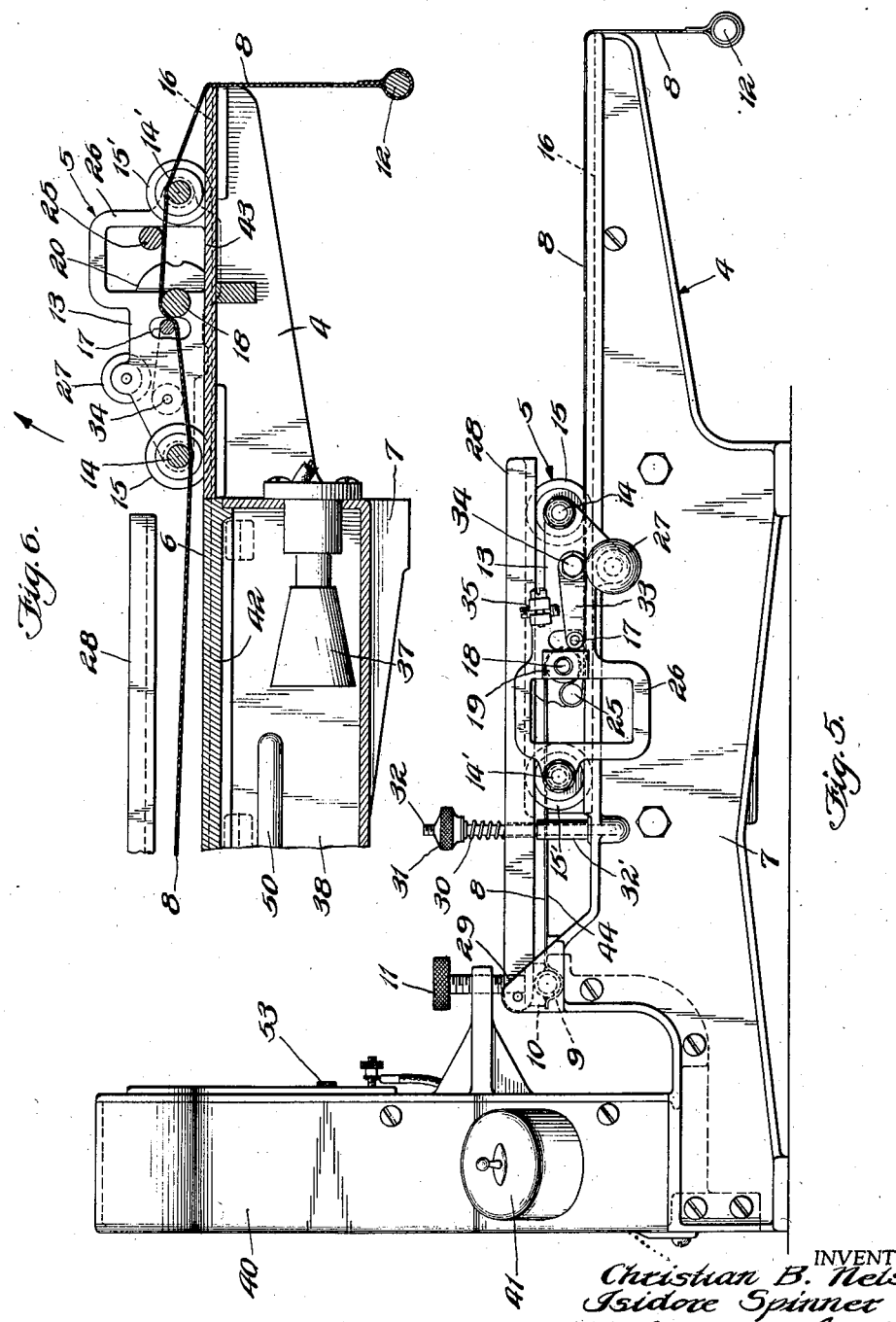

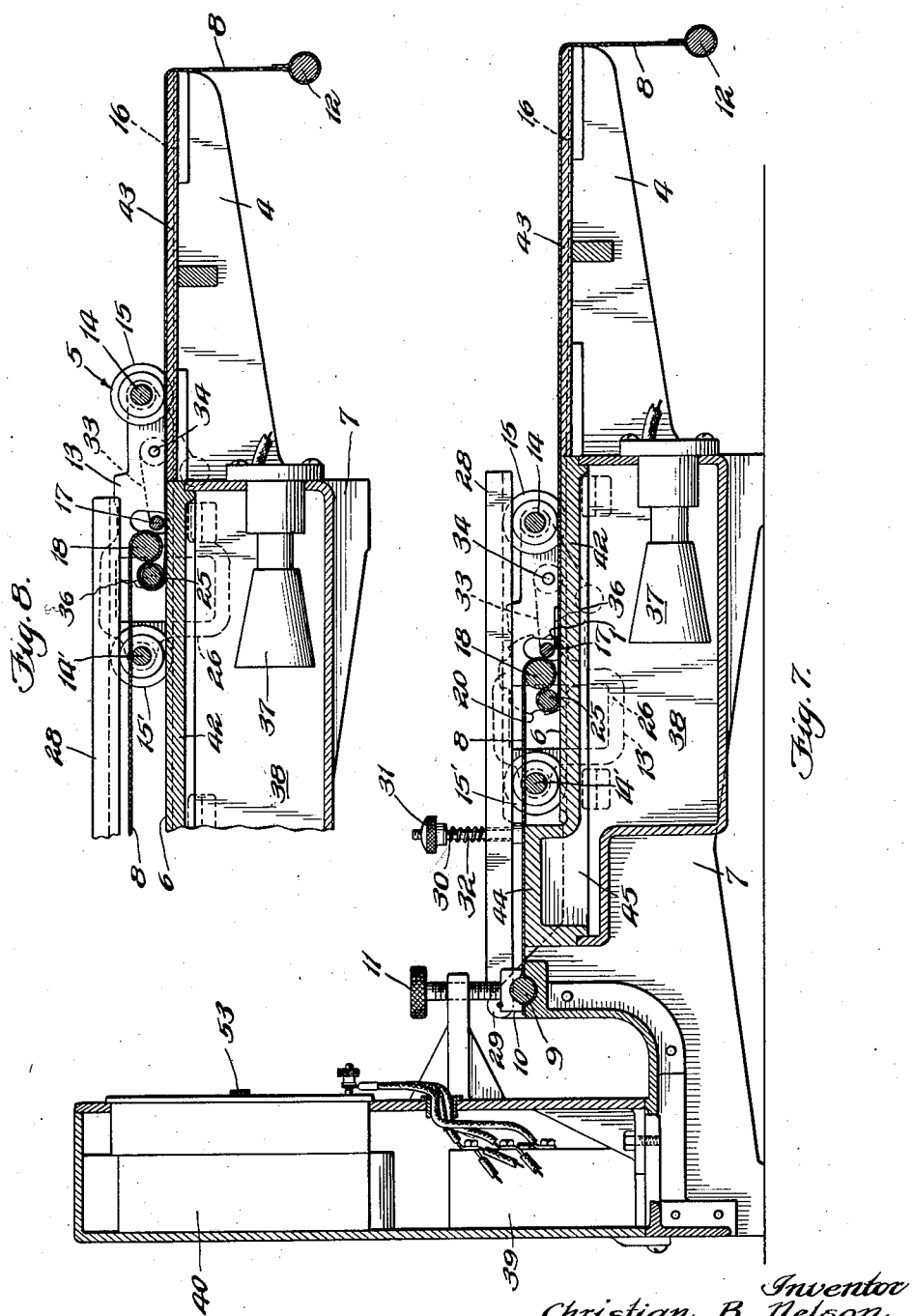

Patented Aug. 13, 1940

2,211,743

UNITED STATES PATENT OFFICE 2,211,743

BINDER FORMING APPARATUS

Christian B. Nelson and Isidore Spinner, Chicago, Ill., assignors, by mesne assignments, to Plastic Binding Corporation, Chicago, Ill., a corporation of Delaware Application July 17, 1936, Serial No. 91,093

20 Claims. (Cl. 18—19)

The present invention relates generally to curling apparatus for curling plastic material, and more particularly to such apparatus as may be used for forming a comb-shaped binder of Celluloid, pyroxylin, or the like. The binder made by the machine of the present invention is used for suitably binding together the pages of a book, cards, or the like, as is disclosed in the patent to Douvry, No. 1,970,285, granted August 14, 1934. A suitable machine for inserting pages into this binder is disclosed in our pending application, Serial No. 70,355, filed March 23, 1936.

The material for forming the binders is first stamped, or cut, to form a continuous back portion from which extend a plurality of parallel fingers. The material used is such that it becomes plastic when heated, and may be formed to the desired shape, which shape is retained when the material cools.

One of the principal objects of the present invention has to do with the provision of the novel method of and machine for curling these fingers upon themselves to form a plastic tubular binder of predetermined diameter. One of the problems in connection with the formation of such a binder is that of the proper heat application, both as to temperature and as to duration. We have found that if the stock is overheated it becomes soft, loses its form, and tends to adhere to the arbor about which it is curled. The resulting product is commercially undesirable. On the other hand, if the material is underheated it fails to curl properly, resulting also in an undesirable binder. The attainment of the proper temperature, and proper duration for heating are important. In order to avoid overheating of the article it appeared, at first, to be necessary to apply a gradual heat to raise the temperature thereof slowly. This is objectionable in that it greatly increases the cost of making the article. We have discovered that the proper heating of the stock can be obtained, quickly, and reliably, by heating the same in two stages. In the first stage the stock is heated to a temperature slightly below that required for efficient manufacturing operations. The preheated stock is then placed in its operating position where the temperature thereof is raised a small amount, to bring it to the proper point for efficient curling. Due to the fact that the material has been preheated, the additional necessary rise in temperature can be effected quickly, and with precision.

It is a still further object of the present invention to provide a machine wherein the temperature range can be altered as may be required for stock of different thicknesses and yet maintain a close control of the temperature.

It is a still further object of the present invention to provide a machine for making binders of the class described wherein different thicknesses of stock may be used, and yet assure proper aligning of the stock and proper operation of the machine, all without requiring any appreciable amount of work on the part of the operator.

A further object of the present invention is to provide a machine for facilitating the carrying out of the above mentioned methods in a manner which is well adapted to modern quantity production requirements.

The attainment of the above and further objects of the present invention will be apparent from the following specification taken in conjunction with the accompanying drawings forming a part thereof.

In the drawings:

Figure 1 illustrates a binder blank as cut out, but before it is curled;

Figure 2 is a perspective view of a curled binder made by the machine of the present invention;

Figure 3 is a front elevation of a machine embodying the principles of the present invention;

Figure 4 is a plan view of the machine shown in Figure 3;

Figure 5 is a side elevation of the machine shown in Figures 3 and 4;

Figure 6 is a partial sectional elevation showing the carriage in one position;

Figure 7 is a sectional elevation of the machine showing the carriage in a subsequent operation position;

Figure 8 is a partial elevation in section showing the apparatus in another operating position; and Figure 9 is a circuit diagram illustrating the heating control.

Like reference numerals refer to like parts throughout this specification and the appended drawings.

Referring to Figure 1, the blank I is formed of Celluloid, pyroxylin, or any other resilient material which, when heated, becomes plastic and can be formed to the desired shape. Before being curled the blank is in the shape of a comb, having a continuous back portion 2 and a plurality of parallel fingers 3 extending therefrom.

After the comb I has been curled, as will be explained later, the binder takes a cylindrical form, as shown in Figure 2, each finger being curled convolutely upon itself. The binder is made of a material which, although plastic when heated, has sufficient elasticity at room temperatures, so that the fingers may be uncurled to the flat position and upon being released resume the curled form illustrated in Figure 2. A pack of paper, cards, or the like, with aligned perforations, may therefore be positioned so that when the fingers 3 recur under their natural resiliency they pass through the perforations and thus bind the sheets together. Apparatus for performing this assembly operation is disclosed in our co-pending application Serial No. 70,355, filed March 23, 1936.

Referring now to Figures 3, 4 and 5, the curling machine comprises essentially, a stationary table 4 and a carriage 5 movable thereon. The table 4 comprises a working plate 6, which is preferably of metallic or other heat conducting material, mounted on a supporting structure 7.

A wrapper 8, consisting of a sheet of flexible material such as paper, cloth or the like, which has the property of not adhering to the plastic binder, is spread on the plate 6, being fixed at the rear of the table by a rod 9 which clamps the wrapper to the table by means of clamps 10, actuated by hand screws 11, the rod 9 thus bearing across the end of the sheet 8. The front end of the sheet hangs over the front of the table 4 and is kept under a slight tension by means of a weight 12 for the purpose of maintaining the sheet smoothly stretched across the table.

The carriage 5 comprises a pair of end frames 13 secured together by transverse rods 14, 14' which serve as axles for wheels or rollers 15, 15', which support the carriage 5. The wheels have V-shaped treads which roll in V-shaped tracks 16, the carriage thus being positively aligned on the table. The end frames 13 are disposed outside of the supporting frames 7 of the table 4, with suitable clearance therebetween so that the carriage can be rolled on the table, either in the normal position as shown in Figures 3, 4 and 5, or upside down as indicated in Figure 6.

Referring now to Figure 6 which illustrates the initial position of the carriage, the wrapper 8 passes under the rear axle 14, under an aligning rod 17, over a guiding roller 18, over the front axle 14' and down over the front edge of the table. The guiding roller 18 extends across the table between the end frames 13 in which it is rotatably supported in end bearings 19, with its axis of rotation perpendicular to the direction of movement of the carriage. The roller 18 may be turned by hand by means of a hand wheel 20 fixed to one end thereof.

To prepare the apparatus for a curling operation, the first step comprises inserting an arbor 25 under brackets 26 in the end frames 13, in a position above the wrapper 8 as illustrated in Figure 6. The arbor consists of a cylindrical copper or steel rod of a length great enough so that it extends beyond the frames 13 at either side, as indicated in Figure 4.

The diameter of the arbor is made equal to the predetermined desired inside diameter of the curled binders. Hence, where it is desired to make binders of several different diameters, it is necessary to provide a different arbor for each of the desired inside diameters. In all other respects, this apparatus can be used for curling binders of a wide range of lengths, diameters, and thicknesses, as will be explained later.

After insertion of the arbor through the brackets 26, while the carriage is in the position indicated in Figure 6, the carriage is turned over in a clockwise direction about the roller 15' as a center, as indicated by the arrow in Figure 6. Handles 27 are provided on the end frames 13 to facilitate turning the carriage. During this reversal, the bracket 26 carries the arbor 25 to a position on the table back of the roller 18, as illustrated in Figure 5.

The wrapper 8, in this position of the carriage, now passes over the top of the roller 18 and winds around and under the roller, and then back over and around the arbor in a reverse curve, so that the front portion of the wrapper lies spread on the surface of the table or working plate 6, and is stretched tight and smooth by the weight 12. Hence the arbor 25 is caught in the turn of the wrapper and held up against the roller 18.

The next operation consists in moving the carriage toward the left, to the back of the table, whereupon the wheels 15, 15' move under a pair of pressure bars 28—28, each of which is grooved on its under side to fit over the V-shaped wheels 15. These bars 28 are hinged to brackets 29 at the rear of the table, and pressure is maintained by compression springs 30 which press the bars down on the wheels 15, the amount of pressure being adjustable by means of thumb screws 31, which cooperate with threaded studs 32 at the ends of pressure bar guide posts 32' which limit the extent of downward movement of the pressure bars 28 when the carriage is at the forward end of the machine. The posts are anchored in the frame 7 and the studs extend through the springs and through holes in the bars 28. Hence, the carriage, when on the rear portion of the table, is held in alignment by the V-shaped wheels in the grooved tracks 16, sufficient pressure being exerted downward against the wheels to keep them firmly seated in the grooves. In this position the roller 18 is maintained parallel to the surface of the plate 6, with sufficient clearance to pass a flat binder blank under the roller 18, as will be explained presently.

The aligning rod 17 extends through an arcuate slot in each frame 13 and is carried on a pair of crank arms 33 pivoted to the end frames 13 respectively. Upward turning of the crank arms 33 around their pivots 34 is limited by adjustable screw stops 35. The rod 17 is disposed parallel to the roller 18 and hence to the arbor 25.

As the preferred material of which the binders are made requires the application of heat to cause it to become plastic, heating units 37 are provided in a chamber 38 beneath the back portion of the working plate 6. By means of these heaters, this portion 42 of the plate is kept hot at the desired temperature, which may be in the order of 300° to 365° F. depending on the thickness of the material being curled. In this embodiment the heaters are indicated as of the electric type, which by means of a thermostatically controlled relay 39, can be controlled to maintain a substantially even temperature within the chamber 38. A temperature indicator 40 is provided at the rear of the table, as well as a switch 41 for energizing the heat control equipment.

Referring now more particularly to Figure 4, a blank 1 of the material to be curled, is now laid on the wrapper 8 on the table in front of the roller 18, with the continuous back portion 2 pressed against the aligning rod 17 and aligned therewith, thereby aligning the blank 1 parallel to the arbor 25, with the fingers 3 at right angles thereto. Then by moving the carriage forward, the aligning rod 17 rides up over the blank 1, the stops 35 being adjusted to permit the crank arms 33 to rise only an amount sufficient to allow the aligning bar 17 to rise over the blank, and exert a small amount of pressure thereagainst. As the carriage moves forward, the roller 18 passes over the blank 1 without touching it, and finally the blank is wrapped around the arbor 25. With proper tension applied to the wrapper 8, the wrapper holds the piece in contact with the arbor 25, the roller 18 keeping the wrapper wrapped around a substantial portion of the surface of the arbor.

As the blank engages the arbor, it is desirable to turn the roller 18 by the hand wheel 20 as the carriage progresses, to prevent the wrapper from catching or sticking. By turning the wheel 20, the winding action of the wrapper 8 can be insured, notwithstanding the resistance offered by the blank 1.

Referring now more particularly to Figure 8, the blank is shown wrapped around the arbor 25 and held in place by the wrapper 8 which, in turn, is held in wrapped position by the roller 18. At this point in the process, the carriage has moved over part of its travel, the arbor 25 and the piece 36 being rolled across the hot portion 42 of the working plate 6, during which time the blank 1 has become heated to a plastic condition.

Further movement of the carriage 5 rolls the arbor from the hot portion 42 of the plate 6 to a comparatively cooler portion 43 at the front of the table. As the binder cools on the arbor it loses its plasticity and becomes elastic, but retains its curled shape. Therefore, it may now be removed from the arbor 25. This is accomplished by again reversing the carriage after it has passed out from under the pressure bars 28. By turning the carriage over, this time in a counter clockwise direction, it is again placed in the position shown in Figure 6. Now the arbor can be withdrawn from the brackets 26, and the curled binder can be slipped off the arbor, and is now curled as shown in Figure 2. After the binder is cool, it is elastic, so that if the fingers are straightened they will recurl upon being released, as heretofore explained.

The carriage is now again in position for the initial operation of inserting the arbor. It is desirable to cool the arbor between operations so that each successive binder will receive equal amounts of heat and be subjected to the same temperature. In practice, this is done by keeping a supply of arbors at hand, a cool arbor being taken for each operation.

It is desirable that the blanks 1 be heated to their proper temperature quickly, without any danger of overheating. To accomplish this result we provide for the preliminary heating of the blanks to a temperature approximately, but slightly under, the requisite curling temperature. A preheated blank may then be placed on the table 6 where it is quickly brought to its proper temperature, even though the table 6 is not appreciably above the requisite temperature. If a cold blank were placed on the table 6 it would have to remain on the table an appreciable length of time before its operating temperature was reached, which would slow down the manufacturing processes, or the table would have to be at an appreciably higher temperature, with the consequent danger of overheating the blank if it is kept on the table too long. To effect the preliminary heating of the material, a preheating plate 44 is provided at the rear of the table, said preheating plate being but a continuation of the heating plate above the working surface of the plate 6, and somewhat above the working surface of the plate 6. The preheating plate 44 is disposed over an auxiliary warming chamber 45 which is in communication with, and constitutes an extension of, the heating chamber 38. A stack of blanks, or flat pieces 1 to be curled, is kept on this preheating plate 44, from which stack the pieces are withdrawn for curling.

It is essential that the temperature be accurately controlled. If the temperature is too high, the material may adhere to the arbor, or the comb teeth may lose their shape, or other objectionable results may follow. If the material is too cold it will not curl properly. It is, therefore, essential that the temperature be correct, and the duration of the application of heat be correct. The optimum operating temperatures differ for combs of different thicknesses. We provide means for regulating the temperature of the machine to maintain the same within proper limits, the arrangement being such that the operating temperature of the machine may be changed, at will, as may be required for combs of different thicknesses. In Figure 9 we illustrate one control system. A temperature responsive element 50 is located within the heating chamber 38. This element comprises a metal tube containing a suitable liquid which expands in proportion to the temperature. The expansion of the liquid controls a movable pointer 51 of the indicator 40, whereby this pointer indicates the temperature within the heating chamber. Another pointer 52, which is the control pointer, may be set at any point on the scale of the indicator 40, by means of a knob 53 (Fig. 3). The pointer 52 carries a contact support having two contacts 54—55 which are engaged by a contact 56 on the pointer 51 in different positions of the pointer 51. The contacts 54—55—56 control the windings of the relay 39. The relay 39 includes two windings, namely, an "off" winding 60 and an "on" winding 61. The winding 60 controls a switch spring 62, and the winding 61 controls a latch 63. When the contact 56 of the pointer 51 engages the contact 55 it establishes a circuit for the winding 61, which attracts the latch 63, thereby releasing the contact spring 62. The contact spring 62 then moves into engagement with a contact 65 and a contact 66. It also moves out of engagement with a contact 67. When it moves out of engagement with the contact 67 it opens the circuit for the winding 61. When it engages the contact 66 it prepares a circuit for the winding 60, which circuit is at that time open at the contacts 54—56, which are not in engagement with one another. At its contact 65 the contact spring 62 establishes a circuit for the operating winding of an electromagnetic switch 68, which thereby operates and, at its contacts 69, establishes a circuit for the heating elements 37. The heating elements thereby commence to heat the chamber 38. Heating of the chamber 38 causes the pointed 51 to move in a clockwise direction. When the temperature has risen sufficiently, the contact 56 engages the contact 54. This establishes a circuit for the winding 60, by way of the contact 66 and the contact spring 62, through the operating winding 60, contact 54, contact 56, to the opposite side of the line. Energization of the winding 60 causes the spring 62 to be drawn back to the position indicated in Figure 9 where it becomes latched by the latch 63. Opening of the contact 66 opens the circuit for the winding 60. Opening of the contact 65 causes deenergization of the relay 68, resulting in opening of the contacts 69, which opens the circuit for the heaters 37. At the now closed contact 67 a circuit is prepared for the operating winding 61. The temperature of the heating chamber 38 now commences to drop. When the temperature has fallen sufficiently to cause the contact 56 to engage the contact 55 the relay 61 is again energized, thereby again effecting release of the contact spring 62 and operation of the relay 68 to reclose the heater circuit. Thus the temperature within the heating chamber 38 is maintained within narrow limits determined by the distance between the contacts 54—55, and at a value determined by the position of the contacts 54—55 as set by the knob 53.

In compliance with the requirements of the patent statutes we have here shown and described a preferred embodiment of our invention. It is, however, to be understood that the invention is not limited to the precise construction here shown, the same being merely illustrative of the principles of the invention. What we consider new and desire to secure by Letters Patent is:

1. Apparatus for curling pieces of plastic material, which comprises a form, a longitudinally movable carriage for supporting said form, means forming a heating surface over which the form is moved by the carriage, means for pressing said carriage towards said surface and means responsive to longitudinal movement of said carriage, for conforming at least one of said pieces to said form and including a wrapper pressing said piece against said form.

2. Apparatus for curling pieces of thermoplastic material, which comprises a table, means for heating the table, a carriage movable along the table, a form carried by said carriage, and means including a flexible sheet, heated by the table and along the table for conforming at least one of said pieces to said form as said carriage is moved over said piece on said table.

3. Apparatus for curling pieces of material that are plastic when heated, said apparatus comprising a working plate, a carriage movable thereupon, a form carried by said carriage, means for lifting at least one of said pieces from said plate and conforming said piece to said form, said means including a flexible sheet upon which the piece rests and which sheet is extended through the carriage and means for heating at least a portion of said plate in the path of said carriage, whereby heat is applied to said piece during the forming process.

4. Apparatus of the class described for curling a piece of a material that is plastic when heated, which comprises an arbor, a flexible wrapper locked at one end against movement and held at a substantially fixed tension at the other end, means for wrapping said wrapper and at least one of said pieces of material placed thereon around said arbor, whereby said wrapper holds said piece in conformity with said arbor, and means for applying heat to said piece of material comprising a heated table engaging said wrapper.

5. A machine for curling a piece of material, said machine comprising a table, a flexible sheet spread thereon, means for holding the sheet taut and one end thereof fixed, an arbor, means for wrapping said sheet around at least a portion of said arbor, and roller means for maintaining said sheet in said wrapped position as said arbor is rolled along said table, whereby one of said pieces placed on said sheet can be rolled on to said arbor.

6. A machine for curling a piece of material, comprising a table, a flexible sheet spread thereon, an arbor, a carriage adapted for movement across said table, and a roller carried by said carriage, said roller being positioned to hold said sheet wrapped around a portion of the surface of said arbor as said carriage is moved across said table.

7. Apparatus for curling a piece of material to form an elastic binder, comprising a support, an arbor adapted to roll thereon, means for aligning a piece of said material parallel to said arbor on said support, means for holding said piece in conformity with said arbor as the arbor is rolled across said piece, and means for applying heat to said piece.

8. Apparatus for curling a piece of material, comprising a plate, means for heating said plate, a flexible wrapping sheet disposed thereon, an arbor adapted for rolling on said sheet, means for aligning a piece of material parallel to said arbor on said sheet, and means including a roller for maintaining said sheet wrapped around a portion of the circumference of said arbor as said arbor is rolled over said piece, whereby said sheet holds said piece in conformity with said arbor.

9. Apparatus of the class described including a table, a wrapping sheet disposed thereon, a carriage movably disposed on said table, a roller carried by said carriage, said sheet lying over said roller, a removable arbor, a bracket on said carriage adapted to receive said arbor when it is placed upon said sheet, said carriage being adapted to be turned over, whereby said sheet is wrapped around a portion of the circumference of said arbor and maintained in said wrapped position by said roller.

10. Curling apparatus comprising in combination, a plate, means for heating said plate, a flexible sheet disposed thereon, a track along each of two sides thereof, a carriage movably disposed on said tracks, a roller carried by said carriage and spanning said table, said sheet being engaged by said roller, an arbor disposed adjacent said roller during the curling operation, said flexible sheet being wrapped around said arbor and held in said wrapped position by said roller, whereby movement of said carriage along said track causes said arbor to roll on said sheet, as said sheet passes around said arbor and over said roller.

11. Curling apparatus comprising in combination, a plate, means for heating said plate, a flexible sheet disposed over said plate and fixed at one end, a roller, means for rotatably supporting said roller at a predetermined distance above said plate, said supporting means having means for moving said roller over said plate, an arbor adapted to roll on said sheet, said sheet being wrapped around said arbor and said roller respectively, whereby movement of said roller over said plate causes said sheet to wind over said roller and said arbor, thereby rolling said arbor across said plate.

12. A mechanism for curling a piece of a material that is plastic when heated, said mechanism comprising in combination a plate, means for heating said plate, a flexible sheet disposed over said plate and fixed at one end, a roller, means for rotatably supporting said roller at a predetermined distance above said plate, said supporting means being movable with respect to said plate, an arbor disposed on said sheet, parallel to and adjacent said roller, said sheet being wrapped around said arbor and said roller respectively, means disposed on the side of said roller opposite to said arbor for aligning a piece of material to be curled on said sheet, parallel to said arbor, whereby movement of said roller over said plate causes said sheet to wind over said arbor and said roller, thereby rolling said arbor over said piece, and wrapping said piece around said arbor.

13. A mechanism for curling a piece of a material that is plastic when heated, said mechanism comprising a table, means for heating said table to provide a preheating zone, a heating zone, and a cooling zone, a flexible sheet disposed on said table, a roller, a carriage for rotatably supporting said roller at a predetermined distance above said table, said carriage being movable across said table and having means for guiding said carriage so that its direction of motion is perpendicular to the axis of rotation of said roller, an arbor disposed on said sheet behind said roller and parallel thereto during the curling operation, said sheet being wrapped around said arbor and back over said roller during said operation.

14. A machine for curling a piece of material, comprising a table, a flexible sheet spread thereon, an arbor, a carriage adapted for movement across said table, and a roller carried by said carriage, said roller being positioned to hold said sheet wrapped around a portion of the surface of said arbor as said carriage is moved across said table, and means for maintaining the carriage against skewing as it is moved across the table.

15. A machine for curling a piece of thermoplastic material having a plurality of fingers and a portion joining the fingers, to form a binder, said machine comprising a table, a flexible sheet spread thereover, means for maintaining the sheet taut, a carriage adapted for movement across said table, an arbor, a roller carried by the carriage, said roller being positioned to hold said sheet wrapped around a portion of the surface of the arbor as said carriage is moved across said table, said roller being spaced above said table by an amount greater than the thickness of the material being curled plus twice the thickness of the flexible sheet, and means for aligning the material to be curled with respect to the axis of the arbor so that the joining portion thereof is parallel to the arbor, said aligning means comprising a rod carried by the carriage forward of and parallel to the roller and above the sheet, the space, if any, between the sheet and the rod being less than the thickness of the material to be curled, said rod being free to ride on to and upon the material as the carriage is advanced.

16. A machine for curling a piece of thermoplastic material to form a binder, said machine comprising a table, a flexible sheet spread thereover, means for maintaining the sheet taut, a carriage adapted for movement across said table, an arbor, a roller carried by the carriage, said roller being positioned to hold said sheet wrapped around a portion of the surface of the arbor as said carriage is moved across said table, said roller being spaced above said table by an amount greater than the thickness of the material being curled plus twice the thickness of the flexible sheet, means for aligning the material to be curled with respect to the arbor, means carried by the carriage and bearing against a cooperating part on the stationary portion of the machine during movement of the carriage across the table for maintaining the carriage against skewing to maintain the axis of the arbor at right angles to the direction of curling movement of the carriage.

17. A machine for curling a piece of thermoplastic material to form a binder, said machine comprising a table, a flexible sheet spread thereover, means for maintaining the sheet taut, a carriage adapted for movement across said table, an arbor, a roller carried by the carriage, said roller being positioned to hold said sheet wrapped around a portion of the surface of the arbor as said carriage is moved across said table, said roller being spaced above said table by an amount greater than the thickness of the material being curled plus twice the thickness of the flexible sheet, means for aligning the material to be curled with respect to the arbor, means carried by the carriage and bearing against a cooperating part on the stationary portion of the machine during movement of the carriage across the table for maintaining the carriage against skewing to maintain the axis of the arbor at right angles to the direction of curling movement of the carriage, and means holding the carriage against upward movement during at least a portion of the curling movement of the carriage on the table.

18. A machine for curling a piece of thermoplastic material having a plurality of fingers to form a binder, said machine comprising a table, a flexible sheet spread thereover, means for maintaining the sheet taut, a carriage adapted for movement across said table, an arbor, a roller carried by the carriage, said roller being positioned to hold said sheet wrapped around a portion of the surface of the arbor as said carriage is moved across said table, said roller being spaced above said table by an amount greater than the thickness of the material being curled plus twice the thickness of the flexible sheet, means for aligning the material to be curled with respect to the axis of the arbor so that the back thereof is parallel to the axis of the arbor, said aligning means comprising a rod carried by the carriage forward of and parallel to the roller and above the sheet, the space, if any, between the sheet and the rod being less than the thickness of the material to be curled, said rod being free to ride on to and upon the material as the carriage is advanced, means carried by the carriage and bearing against a cooperating part on the stationary portion of the machine during movement of the carriage across the table for maintaining the carriage against skewing to maintain the axis of the arbor at right angles to the direction of curling movement of the carriage, said means for preventing skewing of the carriage being on opposite sides of the carriage and comprising trackways and means riding snugly on the trackways, and means holding the carriage against upward movement during at least a portion of the movement of the carriage across the table.

19. Apparatus for curling a piece of thermoplastic material having a plurality of parallel fingers extending therefrom to form a binder wherein the fingers are curled to constitute a plurality of parallel loops for receiving sheets to be bound by the binder, said apparatus comprising an arbor, a flexible sheet passing around said arbor, means for holding said sheet taut in pressure engagement with the arbor, said arbor and said sheet having relative rolling engagement, means for aligning a piece of thermoplastic material on said sheet in advance of the arbor and with the centers of the fingers of the material extending at right angles to the axis of the arbor, said aligning means comprising a member extending across the sheet forward of the roller against which member the piece of thermo-plastic material is placed, said member being movable upwardly of the sheet and riding on to and upon said material as the material and the arbor are brought towards one another for the curling operation, means for maintaining the sheet around said arbor as the sheet and arbor roll with respect to one another to bring the portion of the sheet whereupon the plastic material rests to a position around the arbor and thus curl the material around the arbor, and means for heating the material to a temperature below that at which fusion occurs but sufficiently high to impart a permanent set to the curled plastic material upon subsequent cooling thereof.

20. Apparatus for curling a piece of thermoplastic material having a plurality of parallel fingers extending therefrom to form a binder wherein the fingers are curled to constitute a plurality of parallel loops for receiving sheets to be bound by the binder, said apparatus comprising an arbor, a flexible sheet passing around said arbor, means for holding said sheet taut in pressure engagement with the arbor, said arbor and said sheet having relative rolling engagement, means for aligning a piece of thermoplastic material on said sheet in advance of the arbor and with the centers of the fingers of the material extending at right angles to the axis of the arbor, said aligning means comprising a member extending across the sheet forward of the roller against which member the piece of thermo-plastic material is placed, said member being movable upwardly of the sheet and riding on to and upon said material as the material and the arbor are brought towards one another for the curling operation, means for maintaining the sheet around said arbor as the sheet and arbor roll with respect to one another to bring the portion of the sheet whereupon the plastic material rests to a position around the arbor and thus curl the material around the arbor, means on opposite sides of the arbor for positively maintaining the axis of the arbor at right angles to the direction of relative movement of the axis of the arbor and plastic material during relative movement of the two, and means for heating the material to a temperature below that at which fusion occurs but sufficiently high to impart a permanent set to the curled plastic material upon subsequent cooling thereof.

CHRISTIAN B. NELSON.
ISIDORE SPINNER.

CERTIFICATE OF CORRECTION.

Patent No. 2,211,743.                                      August 13, 1940.

CHRISTIAN B. NELSON, ET AL.

It is hereby certified that error appears in the printed specification of the above numbered patent requiring correction as follows: Page 4, first column, line 41, claim 2, before the word "along" insert --actuated by movement of said carriage--; and that the said Letters Patent should be read with this correction therein that the same may conform to the record of the case in the Patent Office.

Signed and sealed this 17th day of September, A. D. 1940.

(Seal)

Henry Van Arsdale,
Acting Commissioner of Patents.